Patented Apr. 2, 1929.

1,707,469

UNITED STATES PATENT OFFICE.

HUGH KNIGHT, OF RIVERSIDE, CALIFORNIA, ASSIGNOR TO CALIFORNIA SPRAY CHEMICAL COMPANY, OF WATSONVILLE, CALIFORNIA, A CORPORATION OF CALIFORNIA.

EMULSIFIABLE OIL, OIL EMULSION, AND METHOD OF MAKING THE SAME.

No Drawing. Application filed December 17, 1926. Serial No. 155,558.

My invention relates to a new and improved method of bringing about the thorough emulsification of oils which are substantially insoluble in water and more particularly to the production of emulsions of such substantially non-volatile, viscous oils, substantially free from phytocidal ingredients, such as sulphur compounds and other matters injurious to plants, as are now being largely used for phytonomic purposes in combating the parasites injurious to plant life.

By "viscous" I mean having sufficient resistance to flow to permit their forming films on the foliage etc., and by "substantially non-volatile" I mean non-volatile enough to maintain this film when formed over or within the insect of sufficient thickness to be effective and to produce fatal results. "Substantially free from phytocidal ingredients" of course means that the concentration of the impurities in the oil shall be so small that it will be safe to expose the plant thereto, during the natural period of slow evaporation and absorption of the film.

One feature of the invention consists in the production of the self-emulsifying substantially non-soluble oil. Another feature of the invention consists in the method of modifying oils which are normally difficult to emulsify and the emulsions of which are too difficult or too stable. A further feature of the invention resides in the product thereby obtained. Other features of the invention will appear herein.

It has long been well known that emulsions of wholly or largely insoluble oil can be readily produced by suitable agitation of the oil with water containing a small proportion of soap, casein, soluble starch, gelatin and many other so-called emulsifying agents. It has likewise been known that emulsions could be produced by incorporating with the oil certain substances which were soluble both in the oil and in the water, as for instance, certain metallic soaps or sulphonic acids or their salts. It has been believed that the only way in which an emulsion of oil in water could be formed was by incorporating either with the oil or the water some substance which ultimately remained chiefly dissolved in the water from which protective absorption layers could be produced on the exterior surface of the oil globules and serve to prevent their coalescence.

I have discovered a new way of causing the production of a protective layer on the outside of the oil in globules, namely, the incorporation in the oil itself of some substance which I believe need not be substantially soluble in the water but which will, I believe, preferentially seek the interface between the oil and the water, form thereat a water-wetting surface and thereby act as "interior emulsifiers" because they serve to surround the oil globules as formed with a difficultly removable layer of water of minute thickness. These emulsions appear to have the advantageous properties of readily "breaking" or attaching the oil globules to the surface of plants when sprayed thereon; they need contain no soap, phenol or other emulsifying agent which will be objectionable to plant life; they require no spreading or attaching or adhering agents in order to promote attachment of the globules to the plant and they can be so chosen that both constituents of the oil and the oil soluble emulsifying agent cooperate with one another to produce a fungicidal or insecticidal effect.

I believe that the action of these emulsifying agents can best be theoretically explained by illustration from the behavior of oleic acid which is a typical "polar" emulsifier. If a monomolecular film of oleic acid is spread upon the surface of water and a freshly cleaned and ignited strip of platinum foil is lowered through the monomolecular layer and beneath the surface of the water and if the water is then highly charged with carbonic acid or other gas, bubbles will not be found to adhere to the surface of the platinum sheet. The sheet can be removed and largely dried, after which a water film will spread evenly and smoothly over its entire surface and it may again be immersed in a highly carbonated water without any tendency to collect bubbles. In other words, the normal water repellent, nonattractive surface of the platinum has been coated over with something which gives it a water attractive, gas repellent surface. This is believed to be due to the behavior of the oleic acid molecules when distributed in a monomolecular layer on the surface of the water, to wit, the molecules arrange themselves with the paraffin chains upward extending into the air and the carboxylic groups attracted by and immersed within the water. In fact, it is believed that the unsaturated linkages are also attracted by the water so that the oleic acid molecules exhibit a tendency to lie over diagonally in the water with their paraffin chains exposed to the air. Now, when the platinum foil is passed downward through this surface, the monomolecular layer is carried down with the surface of the plate, the paraffin chains become systematically arranged inwardly in direct contact with the metal while the water attractive chains or double linkages are systematically arranged outward so as to render the plate selectively repellent to gas bubbles and attractive to water films. If, now, the process is reversed and a clean piece of platinum foil is immersed in a body of water, the surface of which is uncontaminated with the oil, and thereafter a monomolecular film of oleic acid is spread upon the surface of the water, after which the platinum foil is removed by raising it through the surface of the water, it is clear that the reversed molecular arrangement is likely to occur, i. e., the film of oil will be drawn upward on the surface of the platinum foil and the water-wetting chains be systematically arranged inward in contact with the foil, whereas the nonwetting paraffin chains will be systematically arranged outward. If this plate be dried and immersed in water it will now be found that a water film spreads with the greatest difficulty, if at all, on the surface of the foil and if it be immersed in a highly carbonated water, bubbles of gas will be readily formed and attach themselves quite strongly to the foil, the surface of which has been modified by the external exposure of the paraffin chains of the oleic acid molecule.

Oleic acid is readily soluble in paraffin oils. In fact it is miscible with the ordinary highly purified petroleum distillates which are regarded as the typical phytonomic oils. When such an oil consisting largely of highly purified petroleum fractions, together with a small percentage of oleic acid dissolved therein, is properly agitated and broken up with water, it readily and uniformly disperses or distributes itself throughout the water in the form of relatively large emulsified globules having readily visible with a low power magnifying glass as of about five diameters and a weak and easily disrupted interfacial membrane but quite capable of remaining as practically stable, that is, a sufficiently stable (although quick breaking) emulsion for all ordinary purposes. Instead of each individual minute droplet of oil being perceptible only under the microscope and being doubly surrounded by and securely locked up in a film of emulsifier dispersed in the water, my new emulsion may consist of gross oil particles dispersed in the water with substantially no external locking film of aqueous emulsifying agent. When spread upon the plant the ordinary emulsion is distributed in a minute layer of oil globules between which and the surface of the plant there is generally a protective film of emulsifying agent permeable to water which tends to promote the washing off of the emulsion instead of which the grosser particles of my preferred emulsion are sufficiently large to be penetrated by the irregularities of the plant surface and in fact the oil globules have substantially no external water-permeable coating so that they are enabled to come into immediate contact with the surface of the plant and unite thereon in the form of a substantially continuous oil film. In the ordinary emulsion the insecticidal action of the oil itself is inhibited by this protective film and this inhibition is found to be in direct ratio to the amount of emulsifier used so that in the more stable emulsions the insecticidal and fungicidal properties of the oil are not readily available for use, whereas in my emulsion the oil itself and whatever specially toxic material it may contain are not prevented from coming in contact with the plant or the insector fungus and are far more readily affected.

I have discovered that generally speaking the fatty acids of the various vegetable and some animal oils, such for example as oleic acid, possess this "polar" quality, as well as certain toxic qualities to a desirable degree. Even some of the oils themselves become sufficiently hydrolyzed to act in this way and when mixed with the oil and added to water will, upon sufficient agitation, adequately and uniformly disperse or distribute the oil throughout the water in relatively large globules having the weak and relatively easily disrupted interfacial membranes. Such "polar" oils, or other oils containing "polar" constituents, are thus readily emulsified and require no emulsifying agent or spreader to be added to the water and do not require the use of various other substances which may be more or less injurious to the plant i. e., the water may be substantially pure, that is, functionally pure, as the oil is self-emulsifying and self-attaching. The percentage of oleic acid which I prefer to incorporate, for example, with the usual phytonomic oil such as Wyrol or Markol, is about five per cent and with this proportion of "polar" compound dissolved in the oil to make a "polar oil" of the whole mixture I am enabled to produce by mere agitation "polar emulsions" containing as high as 10% of oil embraced in a phase consisting of substantially pure water. Such an emulsion is usually stable, i. e. it can be adjusted as to its dilution and can be readily sprayed and spread without destroying the emulsion which at the same time will be quick breaking and effective for parasiticidal purposes on making contact with the surface of the plant or fruit.

Certain other compounds which produce a similar effect are turpentine and eucalyptus oil although they are not as satisfactory in some respects as the oleic acid. Other substances which exhibit to a greater or less degree this "polar" quality, are linolic acid, abietic acid, colesterin, certain higher ketones, some of the insoluble alcohols, terpeniol, paranitranilin, and the like. The proportions of these substances which it is necessary to use to secure the desired effect will obviously vary with the amount of oil to be emulsified in a given quantity of water, the particular character and viscosity of the oil, with the harshness or severity of forming agitation to be used in making the emulsion and with the instability or breaking quality of the emulsion desired.

While I have described in detail the character of my invention and given numerous illustrative examples, I have done so by way of illustration and with the intention that no limitation shall be imposed upon the invention thereby.

I claim:

1. A new article of manufacture, composed of a self-emulsifying mixture of substantially non-soluble oil and a polar compound.

2. A new article of manufacture, consisting substantially of a non-soluble substantially non-volatile viscous oil substantially free from phytocidal ingredients containing an interior emulsifier dissolved in said oil.

3. A new article of manufacture, comprising a self-emulsifying mixture of a substantially non-soluble oil and a polar compound and dispersed in water as a quick-breaking emulsion.

4. The method which consists in incorporating in a substantially non-volatile viscous oil substantially free from phytocidal action, a polar compound and agitating with substantially pure water.

5. The method which consists in incorporating in a substantially non-volatile viscous oil substantially free from phytocidal action, a polar compound agitating with substantially pure water and adjusting the time and character of the agitation to produce an emulsion in which the dispersed oil globules are visible with a low power magnifying glass as of a magnification of about five diameters.

6. The method which consists in incorporating in a substantially non-volatile viscous oil substantially free from phytocidal action, an interior emulsifier substantially insoluble in water as compared with the oil and agitating with water.

7. The method which consists in incorporating in a substantially non-volatile viscous oil substantially free from phytocidal action, an interior emulsifier substantially insoluble in water as compared with oil, agitating with substantially pure water and adjusting the time and character of the agitation to produce an emulsion in which the dispersed globules are visible with a low power magnifying glass as of a magnification of about five diameters.

8. The method which consists in incorporating in an insoluble oil a polar compound, agitating with substantially pure water and adjusting the time and character of the agitation to produce an emulsion in which the dispersed globules are visible with a low power magnifying glass as of a magnification of about five diameters.

9. The method which consists in incorporating in an insoluble oil an interior emulsifier, agitating with substantially pure water and adjusting the time and character of the agitation to produce an emulsion in which the dispersed oil globules are visible with a low power magnifying glass of a magnification of about five diameters.

10. The method of producing oil emulsions, which consists in incorporating in an insoluble oil a polar compound and agitating with substantially pure water, said oil and polar compound being substantially free from phytocidal action.

11. The method of producing oil emulsions, which consists in incorporating in an insoluble oil an interior emulsifier and agitating with substantially pure water, said oil and interior emulsifier being substantially free from phytocidal action.

12. The method which consists in incorporating in an insoluble oil, a polar compound and agitating with water to form an emulsion.

HUGH KNIGHT.